: 2,894,876
Patented July 14, 1959

2,894,876
DEODORANT COMPOSITION

James J. Scanlan, Hillsdale, N.J., and Joseph W. E. Harrisson, Lansdowne, Pa., assignors to American Chicle Company, Long Island City, N.Y., a corporation of New Jersey No Drawing. Application July 17, 1956
Serial No. 598,241

2 Claims. (Cl. 167—93)

This invention relates to deodorant compositions containing copper gluconate as the effective deodorant.

It is an object of this invention to provide a novel composition of matter which has highly effective deodorant properties.

It is also an object of this invention to provide a deodorant composition of matter having as its effective ingredient copper gluconate.

According to our invention copper gluconate is incorporated in a solid tablet confectionery medium. For example, in its preferred use as a deodorant for the mouth it is added to candy tablets, and chewing gum. The carrying agent containing copper gluconate, employed in the normal manner, will produce a marked deodorant effect.

Our novel deodorant composition exhibits useful deodorant properties over a wide range of concentrations of the copper gluconate. In the case of mouth deodorants we prefer to incorporate an amount of copper gluconate which will provide in normal use an average "dose" of about 0.075 mg. Where the carrier composition is to be swallowed, as in the case of candy tablets, such a low dosage will avoid any danger of toxic reactions, while still providing effective deodorization.

We prefer to use in combination with the copper gluconate a glyceride fat or oil of small particle size (i.e. up to 5 microns). Such a glyceride may provide additive deodorant effects in respect of the degree and the type of deodorant action produced. The glyceride is preferably incorporated into the composition in the form of an emulsion. The carrier composition of our invention otherwise will contain the ingredients usual for such compositions.

The following examples of deodorant compositions of our invention illustrate the novel products that may be obtained therefrom. Where the ingredient "glyceride" is listed, this is any suitable glyceride fat or oil having a particle size up to 5 microns, the weight being on a dry fat basis.

Example 1

A deodorant candy tablet having the following composition was prepared:

| | Gms. |
|---|---|
| Sugar | 957 |
| Glucose | 31.8 |
| Glyceride | 4.1 |
| Copper gluconate | 0.049 |
| Flavor | 4.00 |
| Magnesium stearate | 2.86 |
| Total | 1,000.00 |

| | |
|---|---|
| Tablet weight | 1.53 |
| Dose of copper gluconate per tablet | 0.075 |
| Glyceride | 9.6 |

Example 2

The following deodorant candy coated chewing gum was prepared:

Gum centers:

| | Gms. |
|---|---|
| Gum base | 110 |
| Sugar | 340 |
| Corn syrup | 110 |
| Flavor | 5 |

Coating:

| | |
|---|---|
| Sugar | 427 |
| Flavor | 5.0 |
| Copper gluconate | 0.043 |
| Glyceride | 3.5 |
| Total | 1,000 |
| Weight per piece | 1.75 |
| Dose of copper gluconate | 0.075 |

When the various compositions of Examples 1–2 were employed by human subjects in the usual manner for each type of composition, a substantial deodorant effect was obtained.

Although the present invention has been described with reference to particular embodiments thereof, it is not so limited, but extends to other similar embodiments.

What is claimed is:

1. A confectionery solid dosage unit as a deodorant for the oral cavity, comprising copper gluconate and a non-reactive carrier therefor, including sugar, the amount of the copper gluconate by weight being about 0.075 mg. relative to a dosage unit weight of about 1.53–1.75 grams.

2. A confectionery solid dosage, adapted as a deodorant for the oral cavity, in accordance with claim 1, in which the unit contains a masticatory gum.

References Cited in the file of this patent

UNITED STATES PATENTS

| 2,341,986 | Hale | Feb. 15, 1944 |
| 2,762,822 | Vagenius | Sept. 11, 1956 |

OTHER REFERENCES

U.S. Disp., 25 ed., 1955, Lippincott Co., Phila., pp. 1627–1629, 362–365 and 1706.

Stone: Drug and Cos. Ind., vol. 67, August 1950, pp. 192, 193, 266–271, 273 and 274.

Forbes: J. Dent. Res., vol. 31, 1952, pp. 129–131.

Grumbach: Szhweiz. z. Path. u. Bakt., vol. 12, 1949, pp. 97–112. (Cited in Chem. Abstr., vol. 43, 1948, p. 5224e.)